United States Patent
Müller et al.

(10) Patent No.: US 7,318,505 B2
(45) Date of Patent: Jan. 15, 2008

(54) VIBRATION DAMPER

(75) Inventors: Michael Müller, Hennef (DE); Stefan Brehm, Hennef (DE); Bernd Klitsch, Oberstenfeld (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 371 days.

(21) Appl. No.: 10/964,098

(22) Filed: Oct. 13, 2004

(65) Prior Publication Data
US 2005/0087413 A1  Apr. 28, 2005

(30) Foreign Application Priority Data
Oct. 22, 2003 (DE) .................. 103 48 971

(51) Int. Cl.
*F16F 9/00* (2006.01)
(52) U.S. Cl. .............. 188/321.11; 188/322.19
(58) Field of Classification Search ........... 188/321.11, 188/322.19; 403/78–79, 150–158, 270–272, 403/268; 92/260; 228/112.1, 155, 154; 29/888.044, 888.091; 267/64.11
See application file for complete search history.

(56) References Cited

U.S. PATENT DOCUMENTS

| | | | |
|---|---|---|---|
| 2,544,398 A * | 3/1951 | Schaefer ............... 403/272 |
| 2,581,048 A * | 1/1952 | Schaefer ............... 403/268 |
| 3,679,029 A * | 7/1972 | Thomas ............... 188/321.11 |
| 4,096,787 A * | 6/1978 | Sandau et al. ........... 92/260 |
| 4,491,339 A * | 1/1985 | Mizumukai et al. .. 280/124.154 |
| 4,531,618 A * | 7/1985 | Kobiske et al. ........ 188/321.11 |
| 5,423,403 A * | 6/1995 | Handke et al. ........ 188/321.11 |
| 5,896,960 A * | 4/1999 | Ananthanarayanan .. 188/321.11 |
| 6,273,407 B1 | 8/2001 | Germano |
| 6,318,521 B1 * | 11/2001 | Niaura et al. ........... 188/267.1 |
| 6,598,778 B2 * | 7/2003 | Konno et al. ........... 228/112.1 |
| 2003/0160372 A1 * | 8/2003 | Klitsch et al. ........... 267/195 |

FOREIGN PATENT DOCUMENTS

FR  2816677  *  5/2002

* cited by examiner

*Primary Examiner*—Robert A. Siconolfi
(74) *Attorney, Agent, or Firm*—Cohen Pontani Lieberman & Pavane LLP

(57) ABSTRACT

Damping element having a container tube, a piston mounted with freedom of movement in the damping medium-filled tube, a piston rod connected to the piston, and a fastening part for connecting the damping element to the first of the masses which are to be isolated from each other as effectively as possible with respect to vibration, where the piston rod is connected to the other of the masses. The fastening part includes a shaft and a fork, which serves to connect the fastening part to the first mass, where the fork is permanently connected to the shaft outside the area of the fork which is subject to dynamically alternating loads.

8 Claims, 2 Drawing Sheets

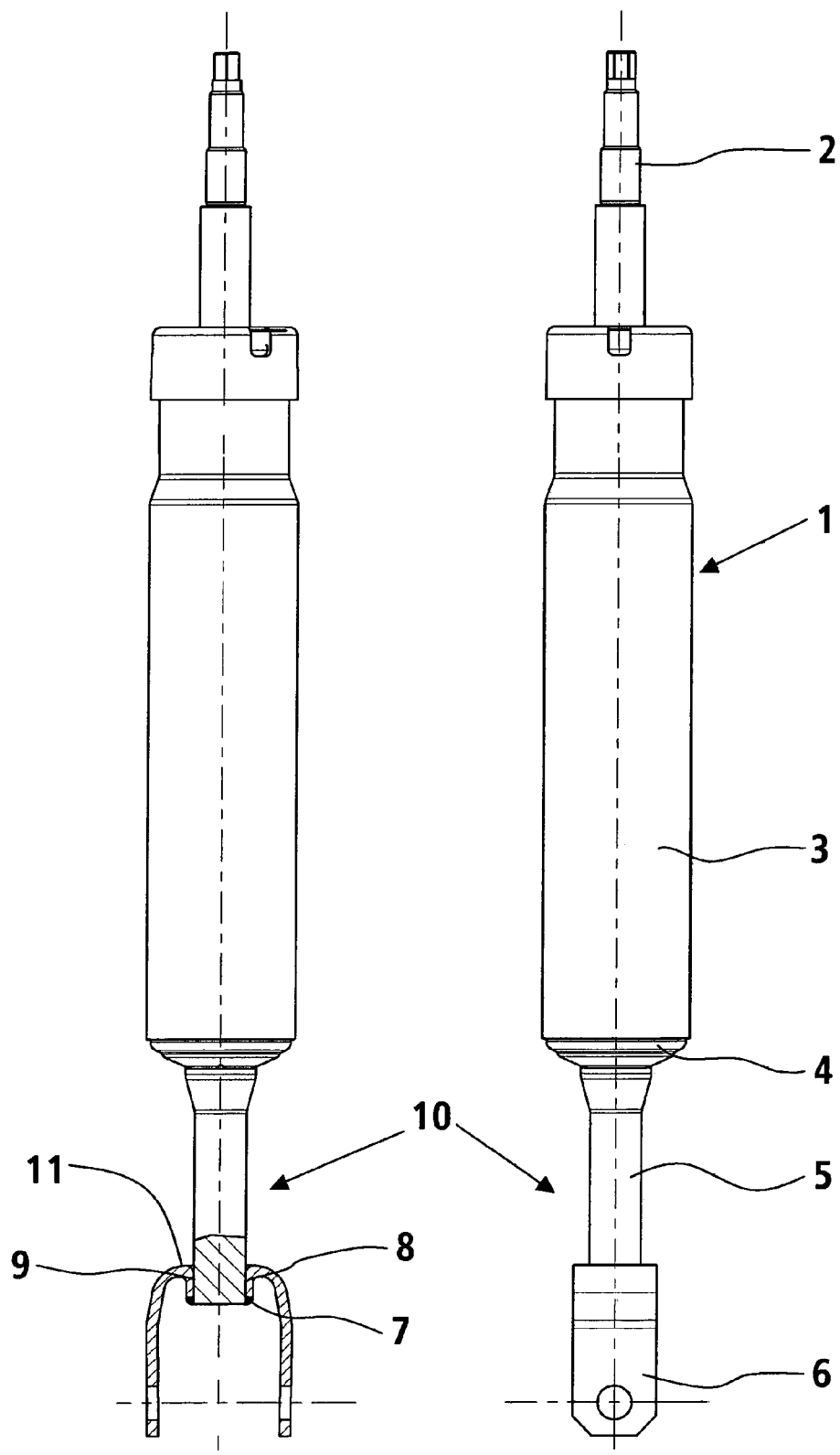

VIBRATION DAMPER

BACKGROUND OF THE INVENTION

1. Field of the Invention

The invention pertains to a damping element having a container tube, a piston mounted with freedom of movement in the damping medium-filled tube, a piston rod connected to the piston, and a fastening part for connecting the damping element to the first of two masses which are to be isolated from each other as effectively as possible with respect to vibration, where the piston rod is connected to other of the masses.

2. Description of the Related Art

Damping elements of this type as described in U.S. Pat. No. 6,273,407, and are used in vehicles, for example, between a first mass, namely, the passenger compartment which is to be kept free of vibration, and a second mass, namely, the wheels and chassis, which are subjected to vibrations when the vehicle is being driven. The damping element is connected by a piston rod, for example, to the first mass and by a fastening part to the second mass, the piston rod being connected to a damping piston, which is mounted in the working cylinder of the container tube. When the fork of a fastening part is connected to the shaft of the fastening part, there can be difficulty in providing the assembly with sufficient strength. In addition, components of this type should also have sufficient fatigue strength, occupy a minimum of space, and also be light in weight.

SUMMARY OF THE INVENTION

The task of the invention is to produce a damping element having a container tube, a piston rod, and at least one fastening element at low cost and with minimal assembly work in such a way that sufficient fatigue strength and lightness in weight can be achieved in a minimum amount of construction space.

According to the invention, the fastening part consists of a shaft and a fork, where the shaft is fixed to the bottom of the container tube, and the fork serves to connect the fastening part to the first mass, where the fork is permanently connected outside the area of the fork to the shaft subjected to dynamically alternating loads.

It is advantageous here that, because the fork is mounted on the shaft, greater fatigue strength is obtained even though no more space is occupied and no more weight is added. In the area of the connection between the shaft and the fork, the fastening part is designed in such a way that the fork and the shaft can be joined together and held in place outside the area of the fork subjected to dynamically alternating loads, that is, outside the bend in the fork.

It is especially advantageous for the shaft and the fastening part to be designed as two separate parts.

In accordance with another essential feature, it is provided that the fastening part includes at least one part, preferably the shaft, which is a forging. It is advantageous here for the fork to be formed of steel plate.

So that the components can be fixed to each other satisfactorily, it is provided that the connection of the shaft to the fork is secured by a simple or multiple combination of pressing, bonding, welding, joining, screwing, peening, and brazing.

According to a preferred embodiment, the fork has a cylindrical collar which coaxially surrounds the shaft. It is advantageous here for the fork to be held in place in the area of the end surface of the shaft or for the fork to be held in place in an area relatively far away from the end surface of the shaft.

It is advantageous here for the point of fixation, e.g., the weld, to be outside the bend in the fork and thus outside the area of the fork subjected to alternating loads. As a result, the fatigue strength can be increased.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWING

FIG. 2 shows a partial cross section of another embodiment of a fastening part with a different design for the fork; and FIG. 2a shows a front view of the fastening part of FIG. 2.

DETAILED DESCRIPTION OF THE PRESENTLY PREFERRED EMBODIMENTS

Figures 1, 1A:
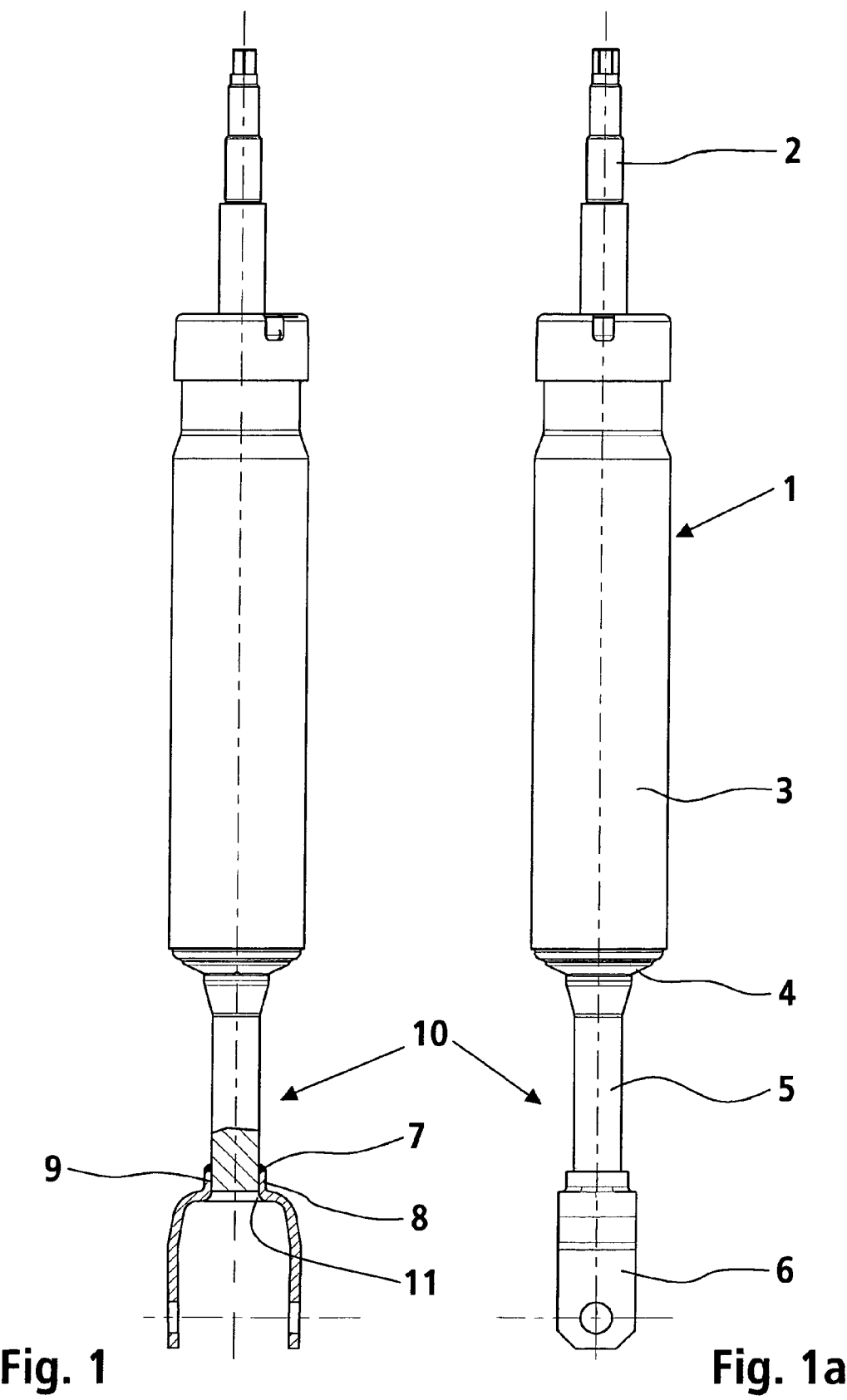
FIG. 1 shows a partial cross section of a damping element with a fastening part.
FIG. 1a shows a front view of the damping element of FIG. 1.

The damping element 1 shown in FIGS. 1 and 1a consists essentially of the piston rod 2, at the end of which a damping piston (not shown) is mounted, and a container tube 3, to the bottom 4 of which a fastening part 10 is attached.

The fastening part 10 consists of a shaft 5 and a fork 6; in the present case, the fork 6 is provided with a cylindrical collar 8. This cylindrical collar 8 serves as a joint site 9 between the shaft 5 and the fork 6 and is welded at this point.

The weld 7 is located in the cylindrical collar 8 a certain distance away from the actual bent area 11. This means that the weld 7 is located outside the area of the fork subjected to dynamically alternating loads. This arrangement therefore has the effect of increasing the fatigue strength range.

FIGS. 2 and 2a show a fastening part 10, in which the fork 6 has a cylindrical collar 8 proceeding in the opposite direction, so that the weld 7 is now in the area of the end surface of the shaft 5, and the bent area 11 is now positioned on the side of the fork 6 facing away from the weld 7. This joint site 9 is also designed in such a way that the area of the fork 6 subjected to dynamically alternating loads is a certain distance away from the weld.

The invention is not limited by the embodiments described above which are presented as examples only but can be modified in various ways within the scope of protection defined by the appended patent claims.

We claim:

1. A vibration damper for installation between a first mass and a second mass of a motor vehicle, wherein the first mass is subject to vibration, said vibration damper comprising:
   a container tube filled with damping medium and having a bottom;
   a piston rod connected to the second mass and to a piston which is axially movable in the container tube;
   a fastening element comprising:
   a shaft fixed to the bottom of the container tube, and a fork having an area connected to the first mass, the fork comprising a bent portion axially spaced from the area and exposed to dynamically alternating loads, the bent portion running into a cylindrical collar axially overlapping and coaxially surrounding the shaft, wherein the collar is fixed to the shaft at an axial distance from the bent portion.

2. The vibration damper of claim 1, wherein the fork and the shaft are constructed as separate parts which are fixed together.

3. The vibration damper of claim 2, wherein the shaft is a forging.

4. The vibration damper of claim 2, wherein the fork is formed of steel plate.

5. The vibration damper of claim 1, wherein the fork is fixed to the shaft by at least one of pressing, bonding, welding, joining, screwing, and brazing.

6. The vibration damper of claim 1, wherein the collar is formed toward the area connected to the first mass.

7. The vibration damper of claim 1, wherein the collar is formed away from the area connected to the first mass.

8. The vibration damper of claim 1, wherein the collar is welded to the shaft.

* * * * *